May 31, 1932.  C. E. RICH ET AL  1,861,134
TRACTOR IMPLEMENT ATTACHMENT
Filed March 10, 1931   2 Sheets-Sheet 1
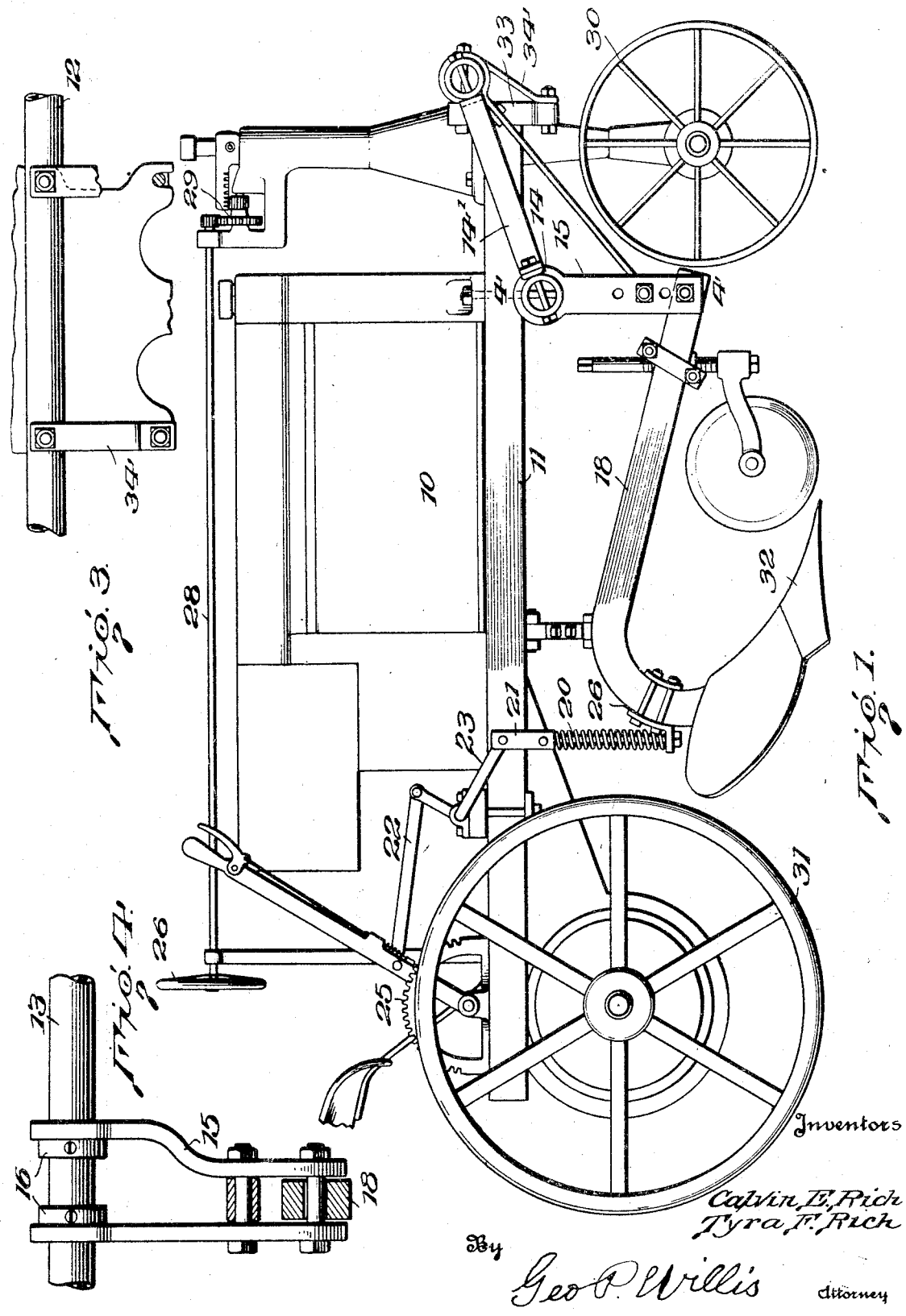

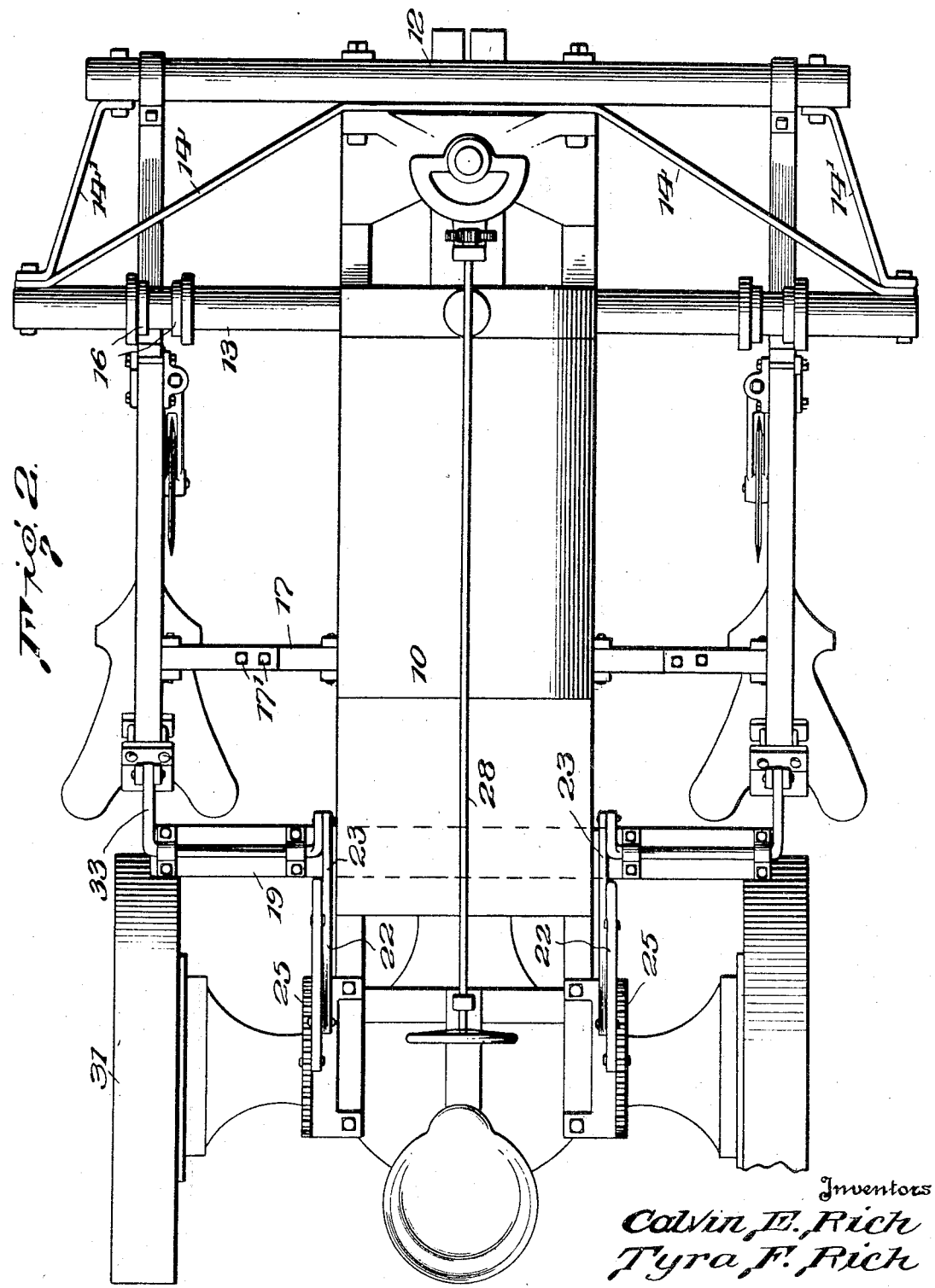

Patented May 31, 1932

1,861,134

UNITED STATES PATENT OFFICE

CALVIN E. RICH AND TYRA F. RICH, OF EL CAMPO, TEXAS

TRACTOR IMPLEMENT ATTACHMENT

Application filed March 10, 1931. Serial No. 521,581.

This invention relates to a tractor implement attachment and more particularly the invention relates to power-propelled agricultural implements.

In many sections, particularly in connection with certain crops, it is necessary or at least very highly desirable in preparing the land prior to planting to bed or list it. That is to say, instead of running a furrow, which forms a depression in the land, and then planting in the furrow, they throw up the earth from both sides to form a raised ridge or seed bed. This is done with "middle buster" plows or listers which are used to break out the earth between the seed beds and casting it laterally upward in the seed beds. Heretofore the usual practice was to use a tractor which straddled the line of one of these seed beds and wherein the lister plows were laterally equi-distantly spaced between the line of said straddled bed and the rear driving wheels with the result that the driving wheels traveled on alternate ridges or seed beds after they were prepared and the weight of the tractor as transmitted through said wheels resulted in very tightly packing such beds, with the result that the seeds planted in such packed bed did not germinate well and it was often necessary to replant them. Also, after the crop came up, it has been very noticeable that the plants on these packed rows do not grow nearly so well as the plants on the rows or ridges which were not packed, this doubtless being due to the fact that a plant cannot penetrate with its roots and seed from soil which has been packed by a heavy tractor to such a degree as nature requires.

The present invention has been developed with the above considerations particularly in view and has for its primary object the combination of a plurality of "middle buster" or lister plows with a row tractor and a supplemental frame structure, said elements being so combined that the front and rear wheels of the tractor will all be disposed in the "middles" between the ridges or seed beds so as to at all times run in said middles and the "middle buster" or lister plows will be disposed directly in line in the direction of travel with the rear driving wheels, and preferably located directly in front of said driving wheels, so as to break out the said middle and cast the earth therefrom substantially in equal amounts laterally in opposite directions upon the pairs of ridges or beds between which the respective lister plows are located.

A further object of the invention resides in providing an improved device of this character in which the driver of the tractor will have convenient control over the implements from the driver's seat.

Another object of the invention is to locate the buster plows in such a position that the driver can easily see them from his driving seat.

An additional object of this invention relates to providing an agricultural implement of this character which is simple, strong, light and durable in construction and comparatively inexpensive in production.

With the foregoing and other objects in view, which will appear as the description proceeds, the invention resides in the combination and arrangement of parts and in the details of construction hereinafter described and claimed, it being understood that changes and modifications in the precise embodiment of the invention herein disclosed, can be made within the scope of what is claimed, without departing from the spirit o1 the invention.

In the accompanying drawings wherein is shown the preferred embodiment of the invention:

Figure 1 is a side elevation of a tractor cultivator embodying our invention;

Figure 2 is a plan view;

Figure 3 is a section view of cultivator hitch; and

Figure 4 is a view taken along line 4—4 of Figure 1.

Referring to the drawings in detail, 10 is the tractor; 11 the tractor frame; 12 a pipe or bar bolted to the tractor in front of the radiator; 13 is a pipe or bar secured under the radiator; 14 and 14' are braces between the front pipe 12 and back pipe 13, 15 are buckheads; 16 clamps for holding the buckheads in position; 17 adjustable brace between the tractor frame and the plow beams 18; 19 is the back cross beam or member attached to the frame 11; 20 compression springs. The respective plow beams 18 are operatively connected to their respective lifting and lowering or controlling hand levers 24 by means of links 22 respectively pivotally connected to said hand levers 24 and to the arm of their respective crank levers 23 which are respectively mounted for partial rotation on the respective end portions of cross beams 19 and have depending crank arms pivotally connected to the respective plow lift rods 21 which are respectively connected to anchoring brackets 26 respectively secured to the respective plow beams 18, the lift rods 21 each having a stem which passes through a perforation in its cooperating bracket 26 and which receives a nut or has an enlarged head below said perforation which nut or enlarged head will serve to pull said bracket and plow beam upward on the proper operation of the hand lever 24. Each said lift rod 21 is provided with a shoulder or face to be engaged by the upper end of a coiled spring 20 disposed about said rod, the lower end of said spring engaging said bracket 26, said spring 21 is normally under compression and serves to force the plow beam 18 downward away from the bar 19 and acts to absorb sudden jolts and jars. Each said hand lever 24 will preferably be provided with a releasable spring pressed locking pin adapted to cooperate with the teeth of the usual ratchet member or quadrant 25.

30 designates the usual front wheels, which are controlled by a suitable steering wheel 28 mounted on a steering rod 27 and controlling said front wheels by means of gearing 29 and connections therebetween to the front axle.

The tractor 10 is supported by the frame 11 which is secured upon the rear drive wheels 31 and the front wheels 30. The plows 32 are situated directly in front of the rear wheels 31, thus the wheels 31 run in the furrows which gives them firm soil to run on. This arrangement gives more traction to the rear or drive wheels and thereby makes it possible to operate the tractor on a minimum supply of fuel.

Cross beam 19 is bolted or otherwise secured to the frame 11 and on the cross beam 19 is secured bearings of suitable construction to receive crank levers 23.

The plow beams are hingedly connected to the frame 11 by the respective adjustable braces 17. Each brace 17 is adjustable at 17' so that it may be varied as to length so as to vary the distance at which the plow beams 18 may be held from the frame 11. The respective extreme front ends of the plow beams 18 are loosely bolted in the respective buckhead members 15 and the buckheads are held in place by the clamps 16. The inside buckheads are offset so as to insure a firmer attachment and prevent the buckheads from swinging to either side.

The cross bar or element 13 is secured to the frame 11 beneath the tractor radiator by bolts or other suitable means. In front of the radiator is secured the cross bar or member 12 which is securely braced to the bar or member 13 and to the cultivator hitch 33 by the braces 14, 14' and 34. The brace 34 holds the bar or member 12 in place when subjected to an upward pressure, which occurs when the tractor is bogged down and it becomes necessary to back the tractor.

Preferably a turf or sod cutting wheel is disposed in advance of each of the plows 32 and is adjustable in vertical position through a bracket mounted in adjustable position on the cooperating plow beam 18 and adapted to be rigidly held in adjusted position thereon, all as shown in Figures 1 and 2.

The construction of our tractor attachment is of fewer parts than any now in use and this permits easy attachment or detachment to the tractor. In operation the device will not create a side-draft or cause the tractor to skid under difficult plowing. The plows are so located that the driver of the tractor can easily see them during plowing, and this enables him to make straighter rows and quickly see any trouble that may arise.

Having now described the invention what we believe to be new and desire to secure by Letters Patent is:

A frame and a pair of lister plows adapted to be applied to, and used with, a three-wheel type row tractor having a pair of rear driving wheels, said frame comprising transversely disposed elements adapted to be secured to the tractor, means adapted to have a swinging movement and connected to said frame, in combination with a pair of plow beams respectively connected to said means and extending in line in the direction of travel with the tread of the respective rear driving wheels of said tractor and in advance of said wheels, a pair of lister plows respectively carried by the respective plow beams, a pair of spacing bars respectively pivotally connected at one end to the respective plow beams and at their other ends to their respective adjacent sides of the tractor frame and functioning to maintain the respective lister plows in proper alignment with their respective driving wheels, and to prevent side slip of said lister plows while permitting said lister plows to be raised and lowered, and means for adjustively raising and lowering said lister plows.

In testimony whereof they affix their signatures.

CALVIN E. RICH.
TYRA F. RICH.